(12) United States Patent
Koelblin et al.

(10) Patent No.: US 9,058,917 B2
(45) Date of Patent: Jun. 16, 2015

(54) FATIGUE RESISTANT METALLIC MOISTURE BARRIER IN SUBMARINE POWER CABLE

(75) Inventors: Christian Koelblin, Meximieux (FR); Fredrik Eggertsen, Stromstad (SE)

(73) Assignee: NEXANS, Paris (FR)

( * ) Notice: Subject to any disclaimer, the term of this patent is extended or adjusted under 35 U.S.C. 154(b) by 680 days.

(21) Appl. No.: 12/856,758

(22) Filed: Aug. 16, 2010

(65) Prior Publication Data

US 2011/0048765 A1 Mar. 3, 2011

(30) Foreign Application Priority Data

Aug. 31, 2009 (EP) ..................................... 09305802

(51) Int. Cl.
*H01B 9/02* (2006.01)
*H01B 7/14* (2006.01)
*H01B 7/282* (2006.01)

(52) U.S. Cl.
CPC ................. *H01B 7/14* (2013.01); *Y10T 156/10* (2015.01); *H01B 7/2825* (2013.01)

(58) Field of Classification Search
USPC ............................ 174/102 SC, 120 SC, 106 R
See application file for complete search history.

(56) References Cited

U.S. PATENT DOCUMENTS

| | | | | |
|---|---|---|---|---|
| 3,935,042 | A | * | 1/1976 | Wahl .............................. 156/56 |
| 4,256,921 | A | * | 3/1981 | Bahder ......................... 174/107 |
| 4,454,379 | A | * | 6/1984 | Cleveland et al. ............. 174/107 |
| 4,472,597 | A | * | 9/1984 | Uematsu ................. 174/106 SC |
| 4,626,619 | A | * | 12/1986 | Uematsu ................. 174/106 SC |
| 4,725,693 | A | * | 2/1988 | Hirsch ........................ 174/107 |
| 5,231,249 | A | * | 7/1993 | Kimura et al. .......... 174/105 SC |
| RE36,307 | E | * | 9/1999 | Marin et al. ................. 174/23 R |
| 6,225,565 | B1 | * | 5/2001 | Prysner ................... 174/120 SC |
| 6,509,527 | B2 | * | 1/2003 | Gadessaud et al. ....... 174/120 R |
| 6,982,378 | B2 | * | 1/2006 | Dickson .......................... 174/36 |
| 2010/0025071 | A1 | | 2/2010 | Jeroense et al. |

* cited by examiner

*Primary Examiner* — Chau N Nguyen
(74) *Attorney, Agent, or Firm* — Sofer & Haroun, LLP

(57) ABSTRACT

A submarine power cable (10) has an electrical conductor (1) surrounded by an insulation (2,3,4), said insulation being surrounded by a metallic moisture barrier (5) characterized in that the cable (10) further comprises a semi-conductive adhesive layer (6) surrounding said metallic moisture barrier (5), and a semi-conductive polymeric jacket (7) able to be in electrical contact with sea water surrounding said semi-conductive adhesive layer (6), the overlaying of the metallic moisture barrier (5), the semi-conductive adhesive layer (6) and the semi-conductive polymeric jacket (7) forming a 3-layer sheath.

8 Claims, 2 Drawing Sheets

FATIGUE RESISTANT METALLIC MOISTURE BARRIER IN SUBMARINE POWER CABLE

RELATED APPLICATION

This application claims the benefit of priority from European Patent Application No. 09 305 802.2, filed on Aug. 31, 2009, the entirety of which is incorporated by reference.

BACKGROUND

1. Field of the Invention

The present invention relates to a submarine power cable presenting a high fatigue resistance sheath, an off-shore installation comprising said submarine power cable, and a process of manufacturing said sheath.

2. Description of Related Art

A typical submarine power cable includes an insulated electrical conductor surrounded by a metallic screen, said metallic screen being able to withstand water penetration and any mechanical wear or forces during production, installation and use of said submarine power cable. Generally, the insulation of the insulated electrical conductor is an insulation system comprising a plurality of layers, such as an inner semi-conductive shield, an insulation body and an outer semi-conductive shield.

The submarine power cable can be a dynamic submarine cable or a static submarine cable.

The dynamic submarine cable is mainly suspended underwater. For example it may be connected to floating platforms by means of which oil and/or gas is exploited from sub-sea wells. This cable type may be freely extending in the sea water between two fixing points, for example the platform and the sea bottom, and will therefore be moving with the motions of the sea, including sea currents and wind-induced motions.

Concerning the static submarine cable, this latter is mainly laid on the sea bed. This cable is extended on the sea bottom between two fixing points so that it does not substantially move in comparison with the dynamic submarine cable.

Typically, the submarine power cable is used to transmit electric power of medium or high voltage, wherein medium voltage is referred to as from about 1 kV up to about 40 kV, while high voltage is referred to as from about 40 kV up to about 300 kV or even above that figure. The submarine power cable may be used for either alternative current (AC) or direct current (DC) power.

By way of example, the document EP-A1-1 933 333 describes a submarine power cable comprising a metallic tubular protective sheath as metallic screen, said metallic tubular protective sheath surrounding an insulated electrical conductor.

However, the fatigue strength of said metallic tubular protective sheath is not optimized to protect in a sufficient way the cable from any mechanical wear or forces during its production, installation and use.

OBJECTS AND SUMMARY

The present invention seeks to solve the above-mentioned problems of the prior art, and proposes a submarine power cable with improved fatigue strength properties while preventing water ingress inside the cable.

To this end, an object of the present invention is to provide a submarine electric power cable comprising an electrical conductor surrounded by an insulation, said insulation being surrounded by a metallic moisture barrier, characterized in that the cable further comprises:
 a semi-conductive adhesive layer surrounding said metallic moisture barrier, and
 a semi-conductive polymeric jacket able to be in electrical contact with sea water, and surrounding said semi-conductive adhesive layer, the overlaying of the metallic moisture barrier, the semi-conductive adhesive layer and the semi-conductive polymeric jacket forming a 3-layer sheath.

For the purposes of the present invention, the term "semi-conductive" can be as well understood as meaning "conductive".

One understands by the expression "a metallic moisture barrier" a protective layer preventing moisture or water intrusion into the insulation of the electric conductor.

One understands by the expression "a 3-layer sheath" that the adhesive layer, as an intermediate layer, is directly in (physical) contact with the metallic layer from one side and with the jacket from the other side.

One advantage of the present invention stems from the fact that the 3-layer sheath significantly presents an improvement of its fatigue strength.

In addition, the semi-conducting adhesive layer is fully compatible both with the metallic moisture barrier and with the semi-conducting polymeric jacket. Hence, due to the strong bonding of adhesive layer to both metallic moisture barrier and semi-conducting polymeric jacket, the 3-layer sheath has a high resistance to de-lamination.

Furthermore, the semi-conducting adhesive layer gives special electrical properties between the metallic moisture barrier and the semi-conductive polymeric jacket so that it prevents the presence of a voltage along the metallic moisture barrier which can puncture the jacket, or in other words it prevents undesirable electrical breakdowns occurring between the surfaces of the metallic moisture barrier and the jacket, when the submarine power cable is immersed into the sea.

The Semi-Conductive Adhesive Layer

In the present application, the term "polymer" means "homopolymer" or "copolymer".

The semi-conducting adhesive layer provides excellent electrical contact between the metallic moisture barrier and the semi-conductive polymeric jacket. It can be made from a composition comprising:
 an organic polymer, being preferably easily extrudable, as similar chemical nature as the polymer material of the semi-conductive polymeric jacket, said organic polymer being modified (e.g. grafted) with a monomer with a reactive carboxyl group, such as acrylic acid or acrylic acid ester, and
 a semi-conducting filler in a sufficient loading to render said layer semi-conductive, such as by example a loading from 4 to 30% by weight of the composition.

Said composition can further comprise at least one additive selected among protecting agents against aging phenomena; metal deactivators; adhesion promoters; tackifiers; process aids such as lubricants; coupling agents; and flame retardant fillers; or one of their mixtures.

Said organic polymer can typically be a thermoplastic or an elastomeric polymer material such as, for example, a polyolefin, and more particularly an ethylene based polymer.

The semi-conductive filler can be silver, aluminum or carbon filler, and more particularly carbon black filler.

The protecting agent (or combination of protecting agents) may include antioxidants well-known in the art. By way of example, one cites sterically hindered phenols, especially sterically hindered phenols acting as metal deactivators like Irganox MD 1024 commercialized by Ciba Specialty Chemicals, phosphonite- or phosphite-based antioxidants like Irgafos 168 commercialized by Ciba Specialty Chemicals and amine-based antioxidants such as polymerized 2,2,4-trimethyl-1,2 dihydroquinoline (TMQ).

The preferred semi-conductive adhesive layer is a semi-conductive hot melt adhesive layer. Well-known semi-conductive hot melt adhesive materials, which can be used in the invention, can be for example the reference N 2910 BG commercialized by Nexans France.

Other hot melt adhesive materials, which are not semi-conductive as such, can be either added to one which is semi-conductive, or mixed as such with semi-conductive filler. Said hot melt adhesive materials which are not semi-conductive can be one of the following brands: Yparex (a maleic anhydride modified polyethylene) commercialized by DSM; Fusabond (an anhydride modified polyethylene) commercialized by Dupont; Orevac (an ethylene vinyl acetate based terpolymer) or Lotader (an ethylene acrylate based terpolymer) commercialized by Arkema.

Furthermore, the semi-conductive adhesive layer can advantageously be not cross-linked.

The Semi-Conductive Polymeric Jacket

The semi-conductive polymeric jacket is typically any polymer used in electrical insulation applications, and being preferably easily extrudable, which has been rendered semi-conductive by incorporation of electrically semi-conductive filler.

Said polymer can typically be a thermoplastic or an elastomeric polymer material such as, for example, a polyolefin, and more particularly an ethylene based polymer.

The semi-conductive filler can be silver, aluminum or carbon filler, and more particularly carbon black filler.

When the polymer material of the semi-conductive polymeric jacket is based on a polyolefin, the organic polymer of the semi-conducting adhesive layer can also be a polyolefin.

More particularly, when the polymer material of the semi-conductive polymeric jacket is based on a polyethylene, the organic polymer of the semi-conducting adhesive layer can also be a polyethylene.

The preferred semi-conductive polymer jacket is obtained from a linear low density, medium density or high density polyethylene which has incorporated therein a loading of carbon black from 4 to 30% by weight of the composition According to a particular embodiment of the invention, the semi-conductive polymeric jacket can be the most outer layer of the cable.

Furthermore, the semi-conductive polymeric jacket can advantageously be not cross-linked.

The Metallic Moisture Barrier

The metallic moisture barrier according to the present invention can have a thickness needed to meet electrical properties requirements and fatigue resistance according to the invention.

The metallic moisture barrier is formed from a conducting metal material, preferably consisting of copper, steel or aluminum, for example, and more preferably from a readily weldable metal. The most preferred metallic moisture barrier is a copper moisture barrier.

The most preferred design of the metallic moisture barrier is a tube, so that the metallic moisture barrier is preferably a metallic tube, and especially a tube made from copper.

The metallic moisture barrier can be obtained from a strip of metal, which can be wrapped around the insulation of the electrical conductor. Then the metallic strip is longitudinally welded to form a welded metallic tube.

The metallic moisture barrier (or the metallic tube) is preferably not corrugated in order to get a substantially 100% void-free interface between the semi-conductive adhesive layer and said metallic moisture barrier (or the metallic tube).

The Submarine Power Cable

The submarine power cable can typically comprise a specific insulation, or in other words a insulation system, surrounding one or several electrical conductor(s), said insulation system being covered by the metallic moisture barrier.

Said insulation comprises a first semi-conductive layer, an electrically insulated layer surrounding said first layer, and a second semi-conductive layer surrounding said electrically insulated layer, in order to form a 3-layer insulation.

This insulation system is of importance since it allows to be operated at relatively high voltage levels, more precisely at relatively high levels of electric field strength at the interface between the first semi-conductive layer and the electrically insulated layer compared to cables using a single electrically insulated layer directly extruded around the conductor.

Another object is a manufacturing process of the 3-layer sheath of the submarine power cable according to the invention. Said process comprises the steps consisting in:

ii. heating the metallic moisture barrier, more particularly the external surface of the metallic moisture barrier, iii. applying the semi-conductive adhesive layer around the metallic moisture barrier, and iv. applying the semi-conductive polymeric jacket around the semi-conductive adhesive layer to form the 3-layer sheath.

The heating step ii allows to enhance adhesion between the metallic moisture barrier and the semi-conductive adhesive layer.

In a preferred embodiment, the applying step(s) iii and/or iv is/are done by extrusion, this process being well-know by the man skilled in the art.

In the case where the metallic moisture barrier is a welded metallic tube, the manufacturing process according to the invention can further comprise the step consisting in:

i. welding longitudinally a metallic strip to obtain a welded metallic tube as metallic moisture barrier, and reducing the diameter of said welded metallic tube before the heating step ii.

In this particular embodiment, the step ii of heating the welded metallic tube (or more generally the metallic moisture barrier) advantageously allows to remove residual lubricant from the reducing step (or drawing step) included in the step i. Indeed, the diameter reducing step uses a lubricant, such as for example methanol, to facilitate the drawing of the metallic tube.

The longitudinal welding can be done by a laser or Tungsten Inert Gas (TIG).

Generally, during the manufacturing of the submarine power cable, the metallic strip can be folded around the insulation of the electrical conductor(s). And, after the diameter reducing step, the metallic moisture barrier is in physical contact with the insulation of the electrical conductor(s).

Another object is an off-shore installation comprising a submarine power cable according to the present invention, said submarine power cable extending in the sea between two fixing points.

In this context it should be understood that "off-shore installations" may include floating platforms, platforms standing on the sea bottom, as well as floating vessels. Platforms are primarily, but not necessarily, referred to as platforms by means of which oil or gas is exploited from sub-sea wells.

BRIEF DESCRIPTION OF THE DRAWINGS

The present invention will become more fully understood from the detailed description given herein below and from the accompanying drawings which are given by way of illustration only, and thus, which are not limits of the present invention, and wherein.

DETAILED DESCRIPTION

For reasons of clarity, only the elements that are essential for understanding the invention are shown in diagrammatic manner, and scale is not complied with.

Figure 1:
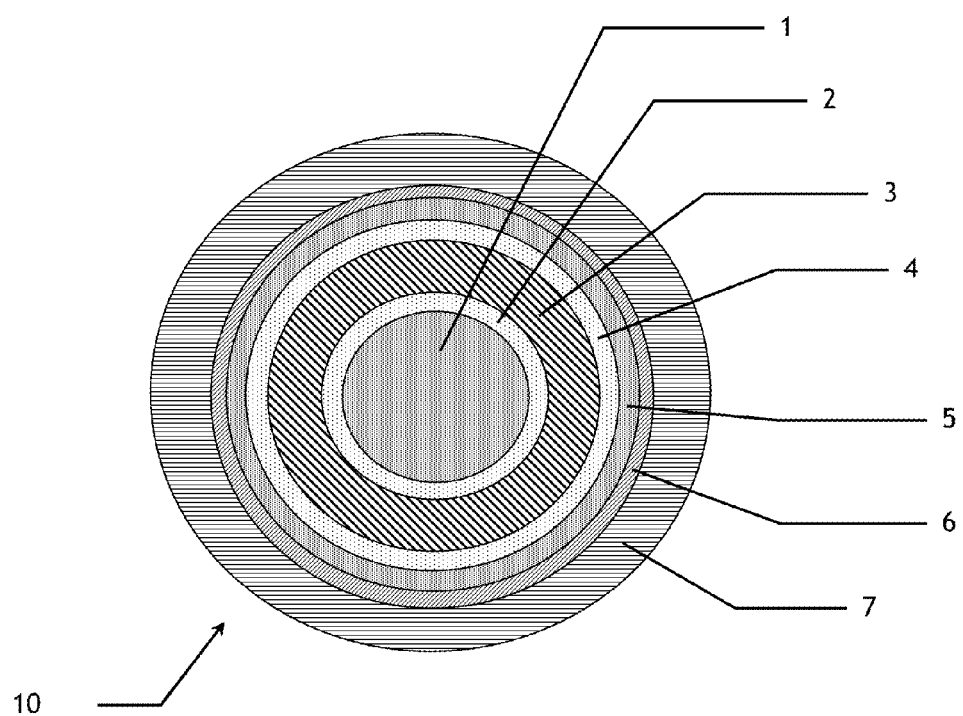
FIG. 1 represents a cross section view of an embodiment of a submarine power cable according to the invention.

FIG. 1 illustrates the cross section view of a submarine power cable 10 comprising from the center and outwards:
- a stranded multi-wire conductor 1;
- a first semi-conducting shield 2 disposed around the conductor 1;
- a wound and impregnated electrically insulated layer 3 disposed around the first shield 2;
- a second semi-conducting shield 4 disposed around the insulated layer 3; the first shield 2, the insulated layer 3 and the second shield 4 forming an insulation system constituted by 3 layers; and
- a 3-layer sheath according to the invention including:
  - a metallic tube 5 disposed around the second semi-conducting shield 4;
  - a semi-conductive adhesive layer 6; and
  - a semi-conductive polymeric jacket 7 disposed around the semi-conductive adhesive layer 6.

Said semi-conductive polymeric jacket is the outer most layer of the submarine power cable 10 so that it can be in electrical contact with sea water when the submarine cable is immersed in the sea.

Figure 2:
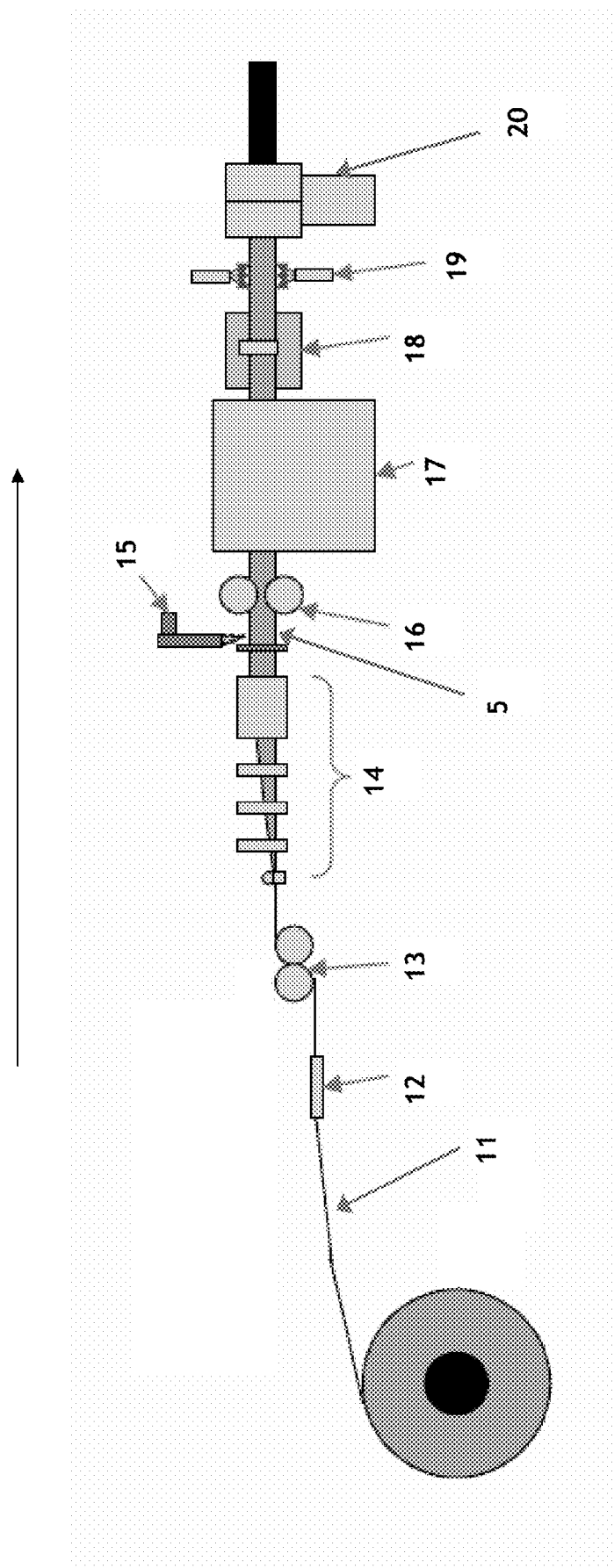
FIG. 2 represents a schematic view of a manufacturing process of the 3-layer sheath of the submarine power cable according to the FIG. 1.

The FIG. 2 presents a manufacturing process line of the 3-layer sheath as described in FIG. 1, the horizontal arrow showing the direction of the process line.

A metallic strip 11 such as a copper strip with a width of 165 mm and a thickness of 0.8 mm, passes through a set of straightening rolls to straighten and apply the proper tension to the strip (not represented).

The metallic strip 11 is then centered in using a centering unit 12 and edge slit 13 to achieve perfect edges and width.

Then, in using forming tools 14, consisting of successive sets of forming rolls, the metallic strip 11 is folded on itself to form a tube longitudinally opened.

During this step, on the same manufacturing line, an electrical conductor insulated with a 3-insulation layer as described in FIG. 1 can be surrounded by said tube longitudinally opened.

The tube longitudinally opened is closed by welding in using a laser welding unit 15, and more particularly a Tungsten Inert Gas (TIG) welding unit. The welding is preferably done using shielding gas consisting of Argon or Helium or a mixture thereof, both from in- and outside the tube to avoid oxidation of the weld seam.

The obtained metallic tube is a longitudinally welded metallic tube 5.

A split clamp caterpillar 17 or the like, as is known per se, may push the welded metallic tube through a reduction die 8 able to reduce the diameter of the metallic tube through a set of reduction dies. The external tube diameter is reduced of about 10% through the reduction die 18.

To avoid the split clamp caterpillar 17 damaging the metallic tube, it is preferable that the tube is positioned correctly so that, prior to the split clamp caterpillar 17, a set of alignment rolls 16 is positioned.

Before entering into a co-extruder 20, the welded metallic tube surface was heated by hot air blowers 19 to enhance adhesion with the semi-conductive adhesive layer, and to remove residual lubricant from the drawing operation (diameter reducing step) and dust or other similar contaminants onto the external surface of the welded metallic tube. The welded metallic tube is heated around 100° C. by said hot air blowers. Hence, the metallic tube achieves very good adhesion with the semi-conductive adhesive layer.

The welded metallic tube then passes through a co-extruder 20 to be recovered by a thin film of an extruded semi-conductive adhesive layer and by an extruded semi-conductive polyethylene jacket.

The co-extrusion step can be replaced by two successive extrusion steps including in a first extrusion step the extrusion of the semi-conductive layer, and in a second extrusion step the extrusion of the semi-conductive polyethylene jacket.

Tests

The different tests mentioned thereafter are done with samples of submarine power cable with an individual length of 3.5 m and manufactured following the manufacturing process as mentioned above according to FIG. 2.

The 3-layer sheath of each sample is composed of:
- a copper tube with a thickness of 0.8 mm and with a diameter of 47 mm, said copper material being obtained from a copper strip for electrical purposes referenced in standard EN 13599:2002 as CW020A and commercialized by various suppliers such as Aurubis and Wieland,
- a layer of a semi-conductive hot melt adhesive material with a thickness of 0.3 mm, said layer being obtained form a mixture of N 2910 BG with 15% by weight of Yparex 0H085, and
- a jacket of a semi-conductive polyethylene material with a thickness of 5 mm, said jacket being obtained from DHDA-7708 Black.

According to a measurement technique based on standard IEC 60840 annex D, the volume resistivity is determined between the copper tube and the semi-conductive polyethylene jacket. The obtained volume resistivity value is inferior to 1 Ωm at 20° C.

According to the standard IEC 60840 annex G, the adhesion of the semi-conductive polyethylene jacket to the welded copper tube is measured with a peel test. The peel strength value obtained from this standard is superior to 5 N/mm. The obtained value with the aforementioned embodiment is over 14 N/mm.

Hence, the semi-conductive polyethylene jacket is strongly bonded to the longitudinally welded copper tube.

Rotational bend fatigue testing has shown that the 3-layer sheath (i.e. laminate) has enhanced fatigue properties compared to lead sheathed cables, i.e. the number of cycles to failure at a fixed strain in the laminate. Further testing reveals that poor adhesion between the welded copper tube and the semi-conductive polyethylene jacket, without the presence of a semi-conductive adhesive layer, decreases the number of cycles until failure because such design caused localized stress concentrations. Therefore, thanks to the semi-conductive adhesive layer, the strong adhesion between the welded copper tube and the semi-conductive polyethylene jacket has significantly increased the fatigue life of the 3-layer sheath.

Hence, the 3-layer sheath of the submarine power cable presents excellent fatigue properties as well as satisfactory electrical load carrying capacity.

The invention claimed is:

1. Submarine power cable comprising:
   an electrical conductor surrounded by an insulation, said insulation being surrounded by a copper moisture barrier, wherein said cable further has:
   a semi-conductive adhesive layer surrounding said copper moisture barrier, and
   a semi-conductive polymeric jacket able to be in electrical contact with sea water, and surrounding said semi-conductive adhesive layer,
   the overlaying of the copper moisture barrier, the semi-conductive adhesive layer and the semi-conductive polymeric jacket together forming a 3-layer sheath, wherein said copper moisture barrier is not corrugated
   wherein the copper moisture barrier is a welded metallic tube and
   wherein said semi-conductive polymeric jacket, when measured with a peel test according to IEC (International Electro-technical Commission) 60840 annex G, exhibits an adhesion to said welded metallic tube greater than 5 N/mm.

2. Cable according to claim 1, wherein the semi-conductive polymeric jacket is the most outer layer of the cable.

3. Cable according to claim 1, wherein the semi-conductive adhesive layer is a hot melt adhesive layer.

4. Cable according to claim 1, wherein the adhesive layer is an extruded layer and/or the polymeric jacket is an extruded jacket.

5. Cable according to claim 1, wherein the copper moisture barrier is a copper metallic tube.

6. Cable according to claim 5, wherein the copper moisture barrier is a welded copper tube.

7. Cable according to claim 1, wherein said insulation comprises a first semi-conductive layer, an electrically insulated layer surrounding said first layer, and a second semi-conductive layer surrounding said electrically insulated layer.

8. Cable according to the claim 1, wherein said cable is configured to extend, in the sea, between two fixing points of an off-shore installation.

* * * * *